United States Patent [19]

O'Sullivan et al.

[11] Patent Number: 5,072,388

[45] Date of Patent: Dec. 10, 1991

[54] LINED CASING INSPECTION METHOD

[75] Inventors: Terence P. O'Sullivan, Seal Beach; William C. Allen, Pasadena, both of Calif.

[73] Assignee: Union Oil Company of California, Los Angeles, Calif.

[21] Appl. No.: 473,227

[22] Filed: Jan. 31, 1990

[51] Int. Cl.$^5$ .......................... G01V 1/00; G01V 1/40; G01N 29/04

[52] U.S. Cl. .................................. 364/422; 181/105; 73/598

[58] Field of Search .......................... 364/422; 367/32; 181/105; 73/623, 598

[56] References Cited

U.S. PATENT DOCUMENTS

| | | | |
|---|---|---|---|
| 3,883,841 | 10/1975 | Norel et al. | 340/15.5 A |
| 4,255,798 | 3/1981 | Havira | 367/35 |
| 4,685,092 | 7/1987 | Dumont | 367/35 |
| 4,703,427 | 10/1987 | Catala et al. | 364/422 |
| 4,751,461 | 1/1988 | McWhirter et al. | 324/221 |
| 4,758,956 | 3/1988 | Duffy | 364/422 |
| 4,783,771 | 12/1988 | Paulsson | 367/57 |
| 4,843,317 | 9/1989 | Dew | 324/221 |
| 4,912,683 | 3/1990 | Katahara et al. | 181/105 |
| 4,928,269 | 5/1990 | Kimball et al. | 181/105 |
| 4,953,147 | 8/1990 | Cobb | 73/598 |

OTHER PUBLICATIONS

"Cement Evaluation in Fiberglass Casing: A Case for Pulse Echo Tools"; Rambow, SPWLA, 29th Annual Logging Symposium, Jun. 1988.

"Corrosion and Electrical Impedance in Concrete", by Hope, Ip, and Manning, pp. 525-534 of Cement and Concrete Research, 1985.

"Cement Evaluation Tool (CET)", pp. 253-257, of Cased-Hole Log Analysis and Reservoir Performance Monitoring, by Bateman, 1985, Boston.

"Interpretive Processing System (IPS) Manual", Chapter 7, and pp. 8-16, by Geo Quest International, Inc, Jul. 1983.

"A Comparison of New Ultrasonic Cement and Casing Evaluation Logs with Standard Cement Bond Longs", by Sheives, Tello, Maiti, Standlen, and Blankinship, Society of Petroleum Engineers, 1986.

"CET: Acoustic Corrosion Evaluation", p. 32 of Corrosion Evaluation, by Schlumberger, 1988.

Primary Examiner—Dale M. Shaw
Assistant Examiner—Xuong M. Chung
Attorney, Agent, or Firm—Gregory F. Wirzbicki; William O. Jacobson

[57] ABSTRACT

A log analysis method can be used to determine a relative condition of a lined casing within a geothermal well from logged instrument data. Uncertain conditions, such as an unknown scale layer thickness, may perturb the indicators of a casing condition within the logged signals. The method can be used to detect the perturbed signals, discern a perturbed reference interfacial indicator in the data, searches for an adjacent interfacial indicator within a window, and axially aligns the adjacent indicator by shifting the data signal towards the reference indicator. The baseline indicator may be an arbitrarily selected signal indicator or a prior (non-scaled/non-eroded) condition indicator. A prior condition indicator can also be used to determine a second window for detecting an adjacent surface signal indicators. The computations used in the present invention are based upon a theoretical model of signal(s) traversing first outward then back across the conducted fluid, scale (if present), liner, casing structure (pipe), cement (or borehole fluid, subsequent casing and cement), and subsurface formation/fluids. The arbitrary or prior condition baseline avoids the need to "know" the actual properties of intervening materials currently required for analysis of casing conditions and some of the extrapolation limitations inherent in current analysis methods. The method can also achieve accurate results by iterating on the baseline indicator.

22 Claims, 4 Drawing Sheets

LINED CASING INSPECTION METHOD

FIELD OF THE INVENTION

This invention relates to the analysis of well logs. More specifically, the invention concerns a method to determine the in-situ condition of a scaled and lined casing string within a geothermal borehole using data from sonic or resistivity logging instruments.

BACKGROUND OF THE INVENTION

Many natural resource industry activities involve determining the unknown or generally uncertain condition of a metallic casing or tubing string cemented or hung in a well bore. Casing and surface piping strings are used to handle fluids produced from or injected into an underground formation. Certain fluids, such as geothermal fluids, may present especially difficult corrosion and other fluid handling problems. Therefore, multi-layered construction (e.g., interior lined pipe having a barrier layer composed of a material such as concrete) is used to handle difficult, corrosive, erosive and scaling fluids.

The properties and condition of the underground casing and cement must be determined periodically to safely operate a well in a difficult application. Casing corrosion, cement failure, and casing shape distortions are some of the conditions that could cause unsafe operation. In-situ inspection is required for a cemented casing. Even when casing is not cemented, in-situ inspection is preferable.

In-situ cement and casing inspections are currently accomplished using various logging tools and instruments. Some of these tools project mechanical calipers to measure the inner or fluid contacting surface of the casing. Other instruments project pressure (e.g., ultrasonic) or electromagnetic wave spherically/radially outward and detect returning waves (i.e., waves affected by the casing/cement materials and interfacial conditions).

Existing well logging instruments are generally wire line supported. The wire line supports the hung instrument, supplies electrical power to actuate/generate the wave, and receives/transmits detected wave signals to an aboveground location. For example, hung electromagnetic instruments contain either 1) electrode potential/current sources, or 2) magnetic/induction field sources which produce electromagnetic waves which can interact with the metallic casing material to produce an induction signal. Similarly, hung sonic (including ultrasonic) type instruments generate a discrete pressure wave which Can interact with the casing/cement to produce an affected, but distinct reflected wave.

The instruments detect the induced or reflected signals/waves (i.e., perturbed signal) resulting from an interaction between the generated signal and the surrounding materials. The perturbed signal can represent one or more casing or cement conditions. Some wire line instruments have two or more receivers placed at different locations or have different orientations for transmitters and receivers so as to obtain radial and/or directional information on conditions at a given depth. Material types and interfaces are detected by "known" changes/perturbations in the perturbed (reflected or induced) signals. Signal perturbations may be to the wave speed, shape, frequency, direction, phase, and/or amplitude.

Normally, the initial (i.e., first radially outward) material/interfacial surface most strongly perturbs the signal, especially for sonic signals. Signals coming from subsequent interfaces (i.e., surfaces) or materials must be corrected for the perturbations caused by the initial material & interface (i.e., subsequent return signals must pass through intermediary signal perturbing materials/surfaces after first passing through them to reach the surface of interest). Thus, unless the initial materials and surfaces do not affect the wave (i.e., are relatively transparent), the condition of a casing must be determined from signal analyses which correct for known signal perturbing intermediary material/interfaces.

Besides the effects produced by the presence of intermediary materials of interest, existing instruments detect other signal perturbing influences. These influences include those identified with fluids present within the casing, fluids occupying the annular spaces between casing strings and between a casing string and the bore hole, and the underground formation. Other formation and casing conditions can also perturb signals. These fluid and other perturbing influences must also be considered in the analysis of the detected signal to accurately determine the condition of the casing.

Existing detected signal analysis methods generally use an idealized model with assumptions. The model treats the detected signals as perturbed by nominal or ideal signal perturbing conditions. For example, an idealized data analysis can assume a perfectly cylindrical casing, a non-interacting well bore fluid, and an infinitely thick formation layer (i.e., data are not affected by the formation boundaries). These models then provide idealized corrections for "known" perturbing factors.

However, the discrete casing or cement material/surface affected components of a signal (i.e., indicators) may be hidden in the data (e.g., signal characteristics obscured by a low signal to noise ratio) in difficult applications. In addition, some perturbing influences or factors may not be "known," making proper corrections difficult or impossible. For example, a deposit of a magnetically active scale having unknown magnetic properties perturbs induced electromagnetic signals carrying information with respect to the thickness of a metallic casing wall. Failure to accurately identify or "know" of the presence of an intervening signal perturbing material(s) compromises all other data. This has led to the inadequate detection of unsafe in-situ casing and cement conditions.

All of the current in-situ casing and cement condition analysis methods known to the inventors either will not work when an intervening material is present or they require a distinct intervening material signal to correct the perturbed signal, or they require a signal which is not affected by intervening materials, or they require an independent knowledge of factors which perturb the signal. The invention provides a method to obtain casing and cement condition information without knowledge of some of the signal perturbing factors, as well as providing other advantages as will become clear in light of the following description.

SUMMARY OF THE INVENTION

The present invention consists of a "differential" analysis method which enables one to determine the casing condition from existing in-situ instrument data even when an unknown amount of multiple signal perturbing influences, such as a scale, casing corrosion, and corrosion by-products, are present. The present invention is, at least in part, founded on the discovery that one can consistently identify a casing reference indicator in the data, shift and align the data to a selected reference indicator, and determine casing conditions relative to the reference indicator regardless of the distortions to the detected signals caused by other perturbing influences For sonic data, the method calls for the stacking of a series of signals and the alignment of adjacent reference interfacial indicators to an arbitrarily selected or a previous baseline condition indicator. A previous baseline (non-scaled/non-eroded) condition for the reference indicator can also be used to determine the size of a calculated differential window for subsequent use.

A second or differential window is calculated to detect otherwise masked or unknown locations of perturbed indicators of material interfaces adjoining the reference interface. Comparison (e.g., substraction) of adjacent interfacial indicators can produce can produce an arcuate indication of thickness dependent of intervening signal perturbing effects. Correlation of these compared signal indicators can also be used to re-align the reference interfacial indicator, i.e., the method iterated.

The alignment and window computations used in the present invention are based upon a theoretical model of signal(s) radially traversing the casing interfaces and materials. The method avoids the need to correct for the effects produced on the wave by "known" intervening materials and interfacial surfaces. By backing into the calculation using an assumed value from shift indicators and through the use of iteration, the method can uncover previously masked information. It also can be used to confirm other independent logged or data sources, if used.

DESCRIPTION OF THE PREFERRED EMBODIMENT

Figure 1:
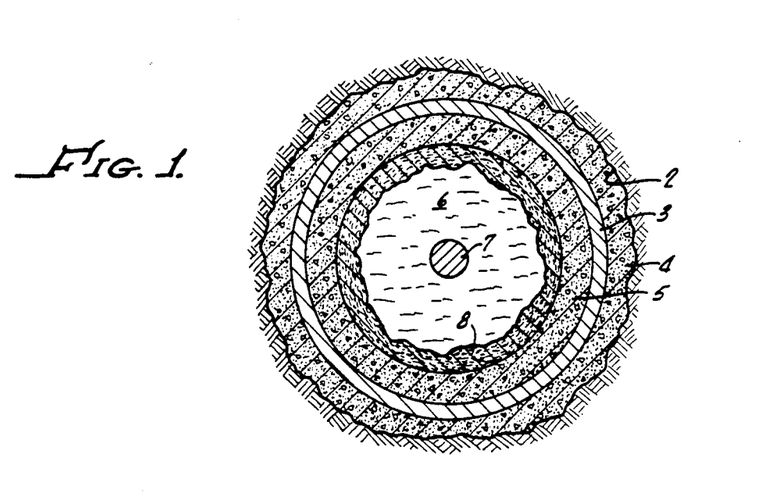
FIG. 1 shows a cross sectional view of a lined casing cemented in a wellbore.

FIG. 1 shows an underground cross sectional view of a fluid conduit or metallic casing 3 in a geothermal formation wellbore 2 (in a geothermal wellbore) looking generally down along the axis of the wellbore 2. The metallic casing 3 (e.g., joined steel pipe sections) is attached to the edges of the underground formation (forming the wellbore 2) by cement 4. A concrete liner or protective barrier 5 is bonded to the interior of the casing 3 to protect the steel or other structural element of the casing 3 from contact with a conducted geothermal fluid stream 6. Fluid stream flow is up or down the wellbore 2 (i.e., into or out of the plane of the paper as shown in FIG. 1).

A wire line instrument 7 immersed in fluid 6 is shown placed at the center of the cylindrical casing 3. Instrument 7 produces and radially projects an electromagnetic field, or pressure waves (or other discrete waves or signals) into the casing 3. The field or waves interact with (among other things) the casing 3, cement 4, and liner 5. The preferred signal is a sonic or ultrasonic wave. The logging instrument 7 is lowered or raised (i.e., the casing is traversed by the instrument) to obtain a series of affected data or discernible signals containing information (i.e., indicators) on the various casing materials and material interfaces present.

Material interfaces representing large impedance contrasts tend to reflect and return sonic signals. Affected signals are used to determine a condition (e.g., interface location, wall thickness, and surface conditions such as pitting) of the casing 3 and/or cement 4. A pressure (e.g., sonde) instrument 7 generates sonic or ultrasonic waves. This type of instrument is typically used to determine the condition of the cement 4 bond. An electromagnetic instrument may be used if only the in-situ condition/properties of the metallic casing 3 are desired. If multiple radial element signal detectors are used in an alternative embodiment, an averaged radial signal at each depth location traversed may also be produced.

Scale 8, chemical and mechanical alteration of the casing liner 5, and intrusions of a different or unknown fluid 6 may mask, distort and perturb the reflected wave, including the indicator, detected by the instrument 7 by an unknown amount. For example, the liner 5 may be permeable, allowing fluid 6 to penetrate the liner 5, damping the sonic signals by an unknown amount. For geothermal applications, a layer of scale 8 (primarily deposits formed by precipitation from fluid 6) can severely mask and alter sonic or electromagnetic signals.

Geothermal scale 8 may contain ferrous or other particles which can be electromagnetically interactive and present multiple interfaces which scatter the signal. The density of a geothermal scale 8 may also vary widely or form multiple layers, depending upon operating conditions. The scale may be soft or even fluid-like (e.g., viscous) intervening material interface) may be undulating, making the reflected signal from the distant interfaces indistinct. The fluid 6 adjacent to the scale 8 may also be layered (i.e., have a fluid boundary layer possessing similar signal perturbing properties as the scale 8), making resolution of the interfacial indicator less distinct within the detected signal.

These fluid, scale, liner, metallic casing, cement, and formation properties and conditions can blur or perturb the indicator(s) such that a safe operating condition can not be determined using existing signal analysis methods. The perturbations may blur the indicators to the extent that no clear signal indicator is discernible, making an assessment of the properties and conditions of the casing or cement impossible. In addition, independent knowledge of the in-situ casing, liner, and scale conditions may not be feasible. For example, the liner may be altered by erosion or corrosion, and the altered liner may also be covered with a soft scale. The locations of the soft scale and the undulating altered casing liner interfaces may even be difficult or impossible to determine using other independent forms of measurement, such as mechanical calipers.

Figure 2:
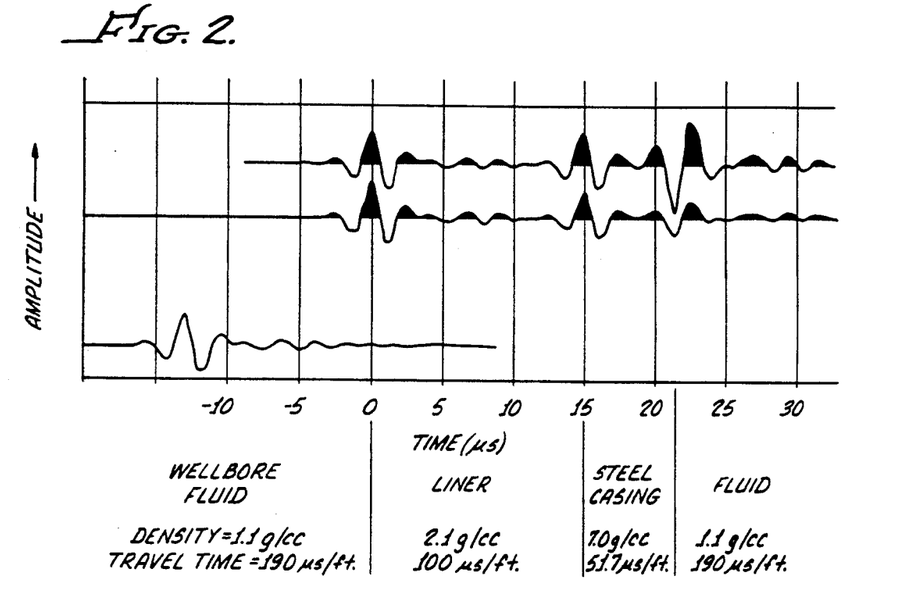
FIG. 2 shows a calculated time response trace of a line casing in a baseline condition.

FIG. 2 illustrates a calculated time response trace 10 generated from a source signal 9 in a lined casing using a Cement Evaluation Tool (CET) instrument. The instrument produces a discrete sonic impulse signal or distinct wave. The "liner" used in this example is approximately 2.3 cm (0.9 inch) thick cement while the "steel" (structural layer of the lined casing as shown in FIG. 1) is 1.9 cm (0.75 inch) thick. The CET instrument 10 may also measure the velocity of the signal in fluid 6 (see FIG. 1) to correct for "known" fluid effects. The "casing" in this example is not cemented to the formation as shown in FIG. 1, but similar trace responses can be obtained and corrections made for cemented casing. The calculated response trace 10 can be further corrected using the raw trace 11 for transmission loss through each material when the location and properties (e.g., density and travel times shown in FIG. 2) of the intervening signal affecting materials and interfaces are known. As discussed above, the properties and locations of intervening signal affecting materials are not always known in some subsurface applications, such as encountered in geothermal energy extraction.

Figure 3:
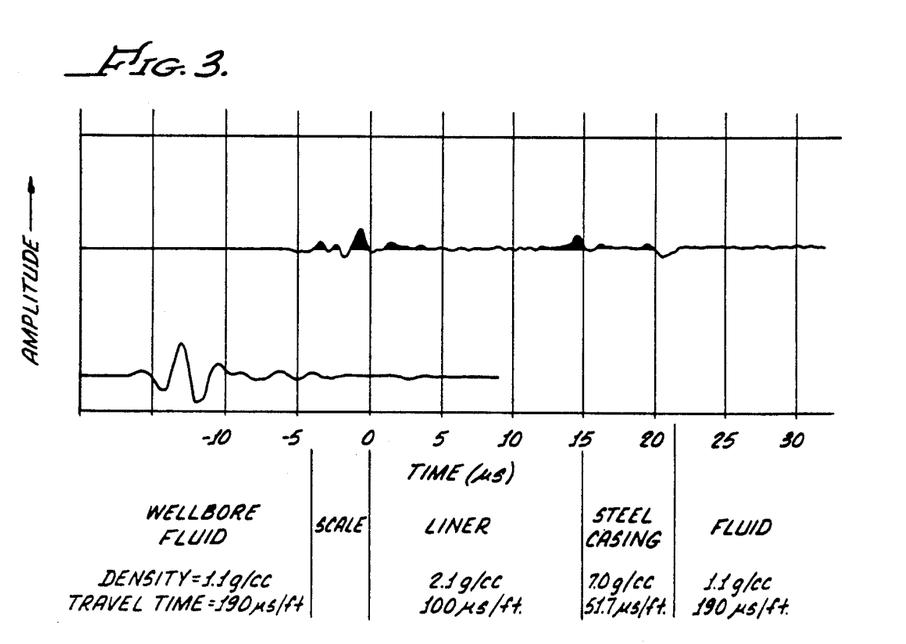
FIG. 3 shows a calculated time response trace in a scaled condition.

Similar to FIG. 2, FIG. 3 illustrates a raw time response trace 12 which resulted when a distinct source signal 9 was radially projected. The signal was again reflected from a lined casing not cemented to the wellbore as in FIG. 2, but now in a scaled condition. The scale creates a first (wellbore fluid to scale) interfacial indicator. Although distinct in the trace shown in FIG. 3, the first interfacial indicator may also be masked and essentially indistinct from other signal noise. The intervening scale also shifts the location and reduces the amplitude of other indicators, thus perturbing the second (scale/liner) and subsequent interfacial signal indicators of interest. A corrected trace, similar to the calculated trace 10 shown in FIG. 2, is not possible without more specific knowledge of the scale properties, and is therefore not shown.

Figure 4:
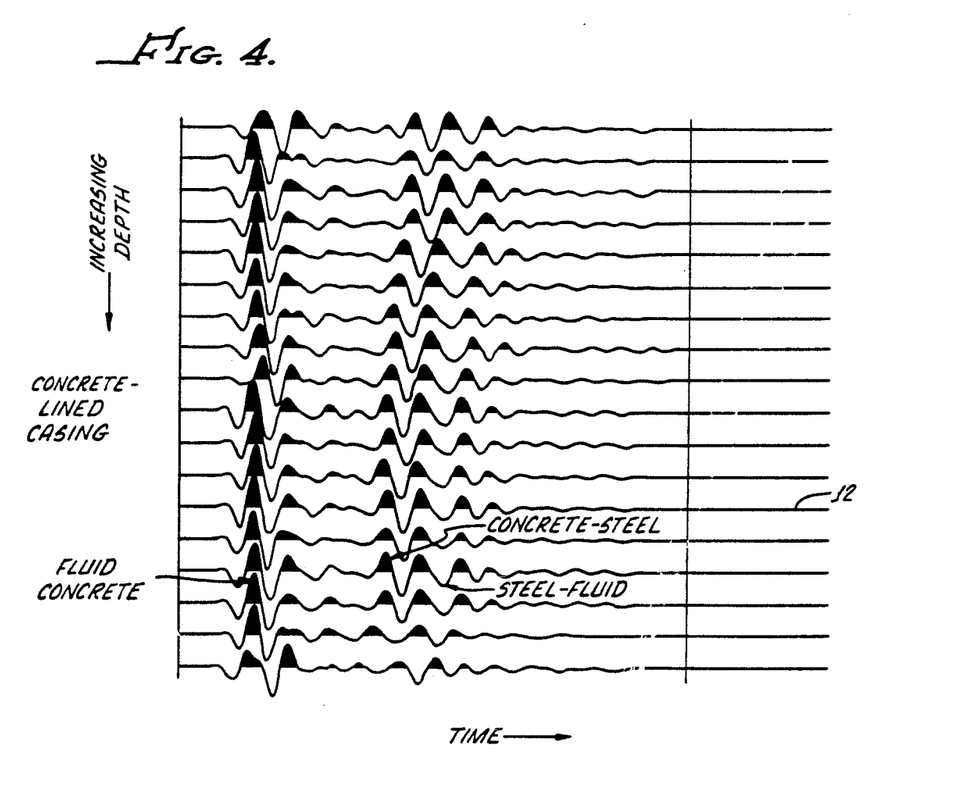
FIG. 4 shows a series of traces from sections of unlined casing in a baseline condition.

FIG. 4 illustrates a series of raw traces 12 (see FIG. 3) obtained over a small depth interval in a well where sections of lined casing had been installed. The positive displacement "peaks" are filled in for clarity (as opposed to negative/downward displacement "troughs"). The raw traces were obtained prior to operation (i.e., no scaling or erosion). The traces are from a portion of lined casing section near a joint (proximate to the bottom traces shown). The traces 12, also having "peaks" filled in for clarity, represent a baseline alignment of raw signals (i.e., stacked signals) obtained for a series of subsurface depths. The traces may be obtained in-situ or prior to running the casing. Traces from unlined casing sections may also be obtained in a similar manner.

Perturbed indicators in the signal can be caused by many operational conditions which can obscure the indicators of a major problem condition. Obscuring conditions are primarily related to inhomogeneous fluids, scale, and liner properties. Obscuring conditions include the presence of micro-fractures in cement, fluid and liner gradients (e.g., density gradients), variable layering, and fluid permeation into the liner.

Figure 5:
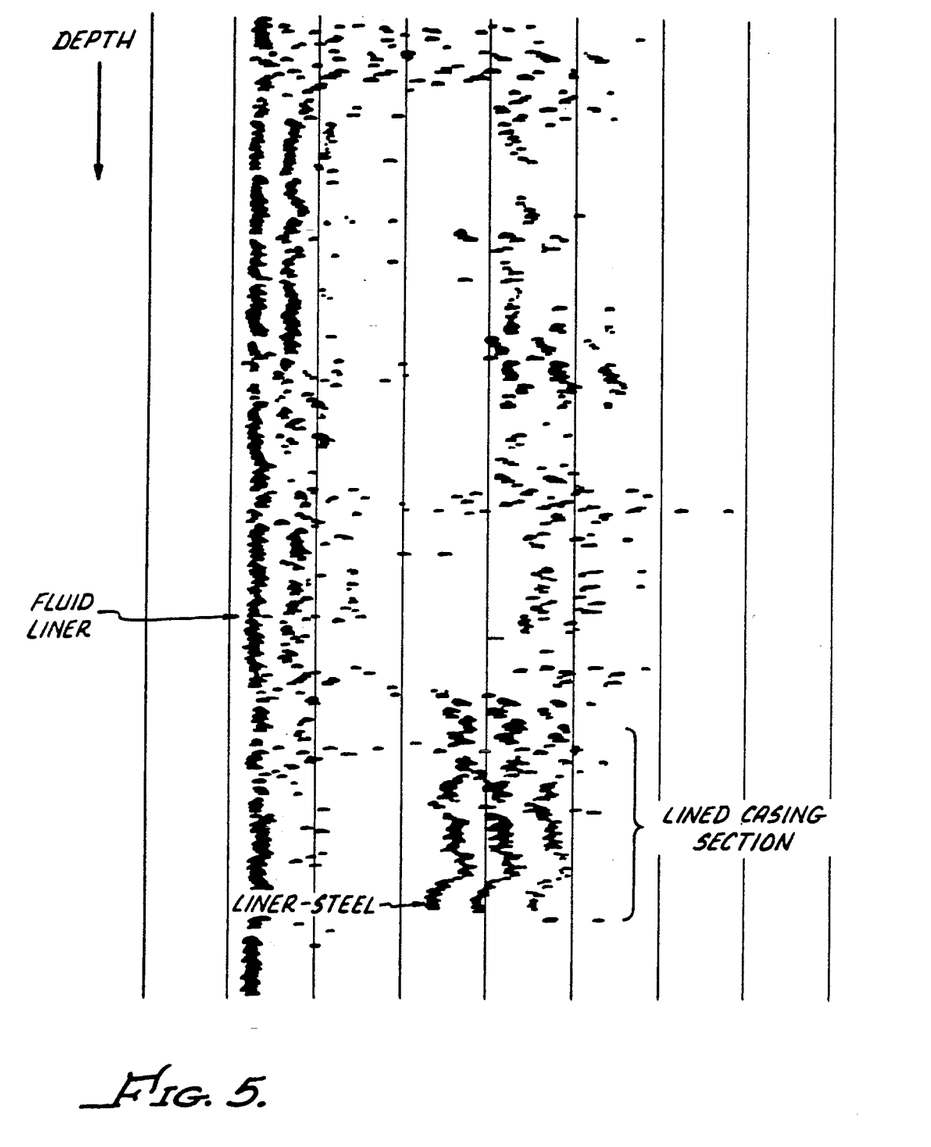
FIG. 5 shows a series of traces from sections partially simulating unknown liner and scale conditions.

Shown in FIG. 5 is a larger portion of a series of stacked raw traces (similar to traces 12 shown in FIG. 4) obtained from a CET transducer when traversing a portion of a test wellbore constructed to simulate several are shown for clarity. The wellbore consisted of different test casing sections joined to partially simulate an eroded and scaled liner. The test section was composed of sections of lined cement (rather than the concrete lined casing shown in FIG. 1) casing wherein the liner cement type and curing method had been deliberately varied for each section. The unequal liner properties perturbed the sonic signal indicators in a manner similar to erosion/scaling, but in this instance the signal perturbing cement properties were generally known for testing purposes.

The sonic logging CET (see instrument 7, FIG. 1) was inserted in the well bore tubulars and a traverse along the well bore axis was made while obtaining a number of signal traces 12 (see FIG. 4) and "peaks" shown in FIG. 5. As expected, clear indications ("peaks") of the initial "fluid-liner" interface were detected. Although perturbed in amplitude and location, the subsequent "liner-steel" interfacial indicator (an indication of a metallic tubular condition is typically a major objective of logging) is a "trough" (not shown for clarity) just before another "peak" (shown in FIG. 5)) and is also easily detected in the data. The variability in the cement properties (simulating conditions after handling a difficult fluid, such as a geothermal fluid) have resulted in the significant displacement of the "liner-steel" interface indicators for each "lined casing section", while the "fluid-liner" (contained fluid contacting) interfacial indicators remain aligned (verifying data accuracy). In normal logging to determine the condition of the steel casing cemented in an operating geothermal well, the initial fluid interfacial indicators are also expected to be masked and displaced, but are still detectable if a narrow window can focus on the correct portions of the data.

Figures 6, 7:
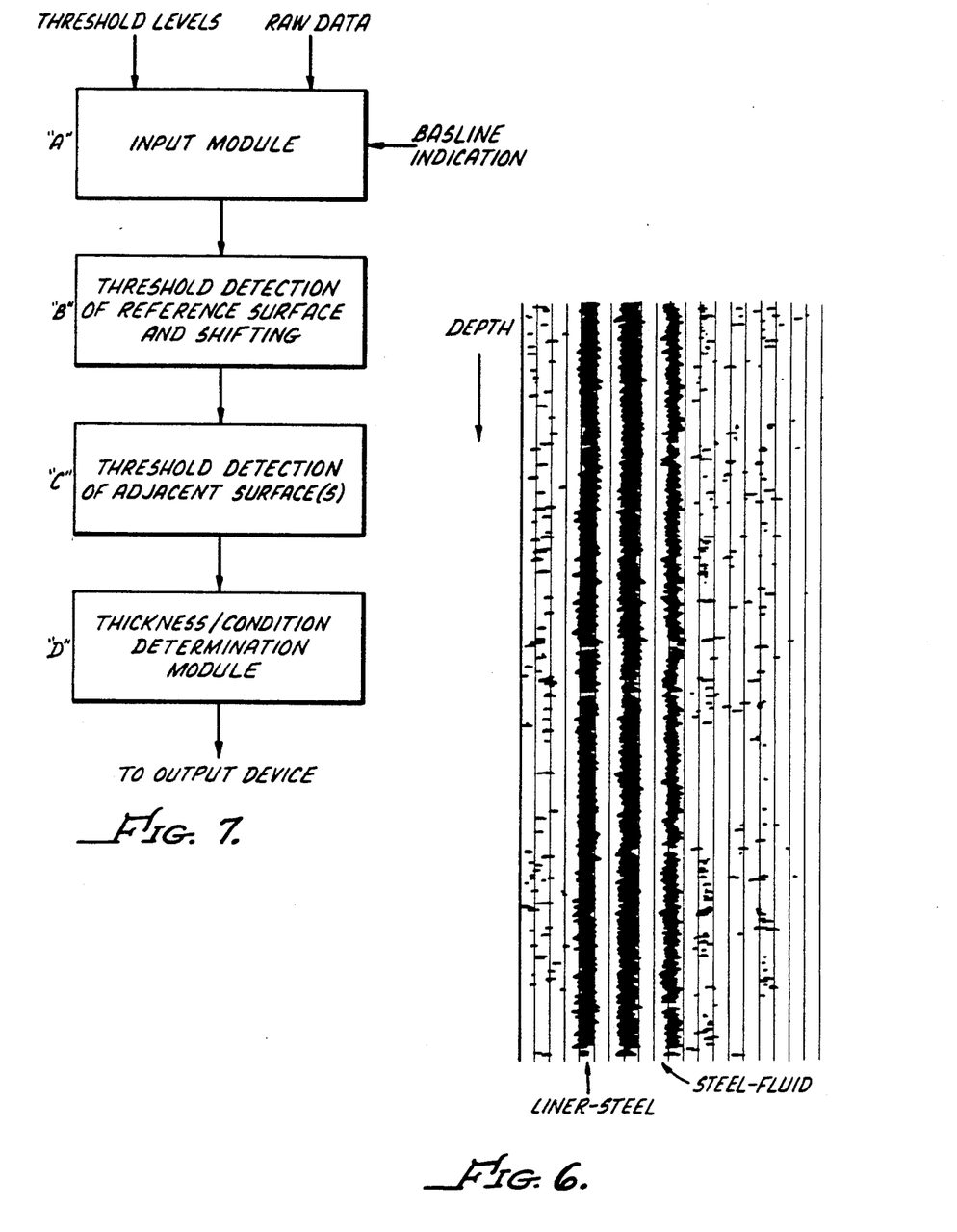
FIG. 6 shows the same series of traces as shown in FIG. 5 after the waveforms were aligned on the cement-steel interface.
FIG. 7 shows a block diagram of an electrical apparatus which incorporates the invention's method.

FIG. 6 illustrates a series of peaks after the raw waveforms 12 (shown in FIG. 4 & 5) were aligned on a selected "liner-steel" interfacial indicator, i.e., a reference indicator. As shown, the "peaks" are aligned, but the alignment is actually accomplished using the preceding "troughs" (not shown for clarity) which represent the "liner-steel" interface. Similar to FIG. 5, only the peaks are shown for clarity. The test "liner-fluid" interfacial indicators (shown in FIG. 5) have also been deleted for clarity. In an alternative embodiment, an indicator baseline (signals from known conditions of the lined casing) is available and is used in place of the reference indicator. Shifting and alignment is based upon the position of a first reference or baseline window (specifying a time response range where the reference indicator is expected) and a cross-correlation routine, correlating the signal traces.

The first reference window location and size is calculated based upon an assumed reference indicator location and an expected range of variation about the assumed location. The reference window is used to focus the detection effort and minimize cross correlation and noise errors. The cross-correlation routine relates a portion of the trace of interest within the window to an arbitrarily selected reference or an adjacent signal trace which is considered a baseline result. If within the window, the signal to baseline cross-correlation result exceeds a threshold value, a linear shift is applied to the trace; if not, the trace is zeroed. Alternative window sizes, indicator detection, and shifting methods can be based upon other indicators, baselines, non-linear relationships or other correlation routines.

This alignment procedure produces a series of traces, aligned at the "liner-steel" (typically a concrete liner 5 to steel pipe 3 as shown in FIG. 1) interfacial indicators.

Radially outward from the "liner-steel" interface is the adjacent "steel-fluid" interface, wherein the "fluid" referred to is a fluid from the formation 2, rather than the fluid 6 as shown in FIG. 1. In an ideal non-corroded/non-scaled uniform wall condition of the casing 5 shown, the "steel-fluid" indicators are also aligned. However, this indicator shift is not expected to align all actual casing inspections. Although similarly perturbed and arbitrarily realigned, the adjacent "steel-fluid" interface indicator relative to the baseline can be used to determine the casing wall thickness (using the known velocity of the signal in steel) without correcting for signal perturbing liner properties and location. After shifting, the comparison (i.e., difference) between the arrival of the adjacent interfacial and the reference interface indicators is primarily a function of casing properties, not the unknown scale or liner properties.

By using the method one can detect otherwise hidden (i.e., indicators which are significantly perturbed, such that they are unrecognizable or indistinct) unsafe conditions, such as thinning caused by corrosion, without needing to "know" liner or scale conditions. Even if the reference surface is not correctly aligned (i.e., mislocated) or is no longer cylindrical in nature (i.e., an error in the assumed geometry), the differential thickness determined by this method is essentially correct.

The amount of shifting required for alignment can also be used to detect the masked location of an intervening material interface, i.e., a "fluid-liner" interfacial surface (see FIG. 5). A second window, measured from the reference surface indicators to the intervening liner interfacial indicators, is based upon the alignment shift and a range of intervening material (i.e., liner) properties. The second window focuses the detection effort onto a narrow segment of the traces of the data. The narrow segment is where the adjacent intervening material interfacial indicator(s) may be found, even if masked. Use of the narrow window and aligned reference surface again avoids difficulties associated with noise and errors in detecting a masked intervening signal.

After detection of intervening materials and interfaces, other casing/cement conditions can be detected. Signal amplitudes can be corrected for transmission loss, as shown in FIG. 2. Corrected indicators (i.e., corrections made to the signal amplitudes and frequencies of the wave forms) can then be used to determine other casing conditions. This includes the extent of delamination (i.e., liner-steel or steel-cement separation), cement alteration and internal failure, and interfacial surface conditions.

FIG. 7 shows a block diagram of an electrical apparatus which incorporates the method of the invention. The input module "A" is in electrical (i.e., signal) communication with the instrument (see item 7 in FIG. 1) and contains means for inputting the logging instrument's raw data signal and related threshold signal/noise inputs, along with reservoir, formation, fluid, and geometry information inputs. The input module may include a digitizing microprocessor and/or a manual keyboard for entry of the data. The input module may have the capability of averaging radial data taken at each depth and means for generating a composite data or signal trace.

The information and data are transmitted to the first threshold detector matrix and computational indicator shifting module "B." A reference surface, such as the "steel-liner" interface shown in FIG. 5, is identified by using a cross-correlation routine. The routine calculates a result from a comparison (made using the routine) between a baseline and the trace of interest within a first window (focusing search). The baseline may also be varied (e.g., using adjacent traces), be a composite of data taken, be an assumed value, or be an indicator taken from a previous instrumental traverse associated with known conditions, e.g., non-scaled/non-eroded well characterized tubulars. Signal cross-correlation and alignment routines, such as the TEEAMP or ALINPUT programs currently available from Western Geophysical, are used. If the signal detected by the cross-correlation routine (comprising signals to an adjacent or composite trace within the window) exceeds a threshold value, a linear shift is applied to the trace, if required. The reference surface is first assumed to be at a relatively constant distance from the instrument as it traverses the wellbore axis. If the cross-correlation routine does not detect a signal which exceeds the threshold, the trace is zeroed or flagged. Hence, only the non-zeroed/non-flagged traces are shifted an optimum amount with respect to the nominal, reference, baseline or adjacent traces.

The optimum amount of the shift applied to a non-zeroed trace is determined by calculating a correlation coefficient for the adjacent/composite and the to be shifted trace. The optimal shift is obtained by a linear shift which produces the largest correlation coefficient.

As an alternative, an initial or pre-shift of the data is also possible. An initial shift may be determined by estimating the properties of any intervening layer(s). This pre-shift estimate may be based upon available data, such as operating time since the previous baseline, or assumed data, such as geometry. This allows for initial corrections of unknown, but suspected changes in liner (e.g., thickness loss resulting from erosion) or scale properties. Using this alternative may not completely result in the desired alignment of the reference signals, but may allow for the use of a narrowed first window and simplify the remaining shifting procedures. Other correlation and optimal shifting techniques, such as those using incrementally increasing window sizes and a regression coefficient analysis having various degrees of freedom, may also be used in alternative methods.

In an alternative embodiment, if the assumed constant radial distance to the reference surface needs to be verified, an iterative process would be employed. For example if casing wall thinning and protective liner detected, the reference surface may no longer be at a constant radial distance from the logging instrument. A composite of both of the shifted steel interface signals (i.e., inside and outside steel surfaces) or a new baseline reference surface (i.e., outside steel surface) can be used in an iterative process to calculate a new (i.e., iterated) shift or pre-shift from the baseline condition. An iterated shifting of the signals, similar to the initial shift discussed above, can then be accomplished. Cross-correlation techniques can then again be used to iteratively converge on an optimum shift of the data.

The detected and optimally shifted data is then transmitted to a second threshold detector "C." Signal indicators from one or more adjacent interfaces, such as the remaining (outward facing) steel surface of the metallic casing are detected within a differential or relative window (measured relative to the shifted first surface signal. If the adjacent interfacial indicator signal exceeds a second threshold, detection is registered, if not, the trace is zeroed or flagged in a manner similar to that referred to in step "B".

The adjacent interface or material indicators may include a change in phase, amplitude (e.g, damping of the "peak" or "trough" magnitudes), frequency (i.e., resulting from resonance), direction, and/or vibrating plane orientation. A combination of signal indicators may also be used to detect a condition or property of an adjoining material or interface.

The remaining, otherwise masked, surface and material signal indicators can now be differentially detected from these adjacent interfacial indicators. A differential window from interface to another can be used to focus the search for these adjacent indicators within an expected range, similar to the detection of adjacent reference interfacial indicators.

The thickness of the casing and other conditions (of the casing and remaining materials) are determined at the computational module "D." The determination of thickness is based upon the travel time difference between adjacent surface(s) and linear wave velocity through the casing material. If the casing is hung within the bore hole, the phase and amplitude of the shifted signal indicator representing the outside surface of the casing with the bore hole annulus can be used to indicate the presence of a bore hole fluid and hence serve as a fluid level indicator within the annulus. The annular (outside casing, such as between casing and wellbore) fluid may be a fluid of unknown or uncertain composition, a naturally occurring formation fluid, or leakage of contained fluids 6 (see FIG. 1), or an introduced fluid such as packer fluids, drilling muds, and blanketing fluids such as gaseous nitrogen. Other calculations can be used to determine other liner, cement, and casing conditions.

In an alternative embodiment, a discrete signal source and/or just a detector may be placed proximate to the outside of a fluid filled pipe which tends to have an outer surface lining and/or scale as well as being subject to an unknown amount of inner surface corrosion and/or scaling, such as found in boiler tubing and shell-in-tube heat exchangers. In other alternative embodiments, similar methods can be used to detect other uncertainties in the conditions and determine the properties of other laminar materials. This can include detecting changes in laminar composition or multi-layer pipe (such as delamination of laminated fiberglass materials) through an intervening outer thermal insulation or protective layer which may have degraded an uncertain amount (i.e., detector is placed near the outside thermal insulation layer rather than at the pipe interior, and determining the condition of composite materials (e.g., detecting layer cracks and delaminations caused by external and internal environments) for quality control or other purposes.

Although the preferred embodiment uses a sonic wave signal, the method can also use indicators associated with (i.e., part of) electromagnetic fields or wave forms. For example, if the induced frequencies of an electromagnetic wave are indicators of the thicknesses of several layers and these frequencies are perturbed by the formation of a conductive or magnetic scale or precipitate, the relative thickness changes of one layer compared to another (reference) layer are determinable from the perturbed indicators. The frequency associated with the first layer is first detected at one point, associated with a baseline thickness (selected arbitrarily or otherwise) within a first window, and the frequencies at the remaining points shifted, analogous to that discussed returning sonic wave forms. The shifting of indicators and signals is based upon as much knowledge of the reference layer and potential scale layer as possible, e.g., the first layer thickness is least likely to be changed from the assumed condition and the signal perturbing scale layer is expected to have an assumed shape, but an unknown thickness. The shift may not be linear, as in the sonic case noted above, but can be calculated or predicted form assumed conditions which affect the signal/indicators. A second layer frequency is then detected within a second discussion. Relative thickness information (e.g., the second layer has thinned with respect to the first layer) can thus be obtained, even in the absence of absolute thickness knowledge, analogous to the sonic embodiment. Iteration may again be used to improve the accuracy of the assumptions and indicated properties.

While the preferred embodiment of the invention has been shown and described and some alternative embodiments also shown and/or described, changes and modifications may be made thereto without departing from the invention. Accordingly, it is intended to embrace within the invention all such changes, modifications and alternative embodiments as fall within the spirit and scope of the appended claims.

What is claimed is:

1. A method for in-situ determining the thickness of a subsurface pipe wall having an outer surface and having an inner surface covered by a lining, said determining method using a sonic signal produced from a wire line logging instrument, said signal capable of being reflected wherein a reflected signal is capable of being detected by said instrument, said reflected signal having indicators of said wall surfaces each of said indicators having a discrete arrival time, wherein said indicators are also affected by said lining, which method comprises the steps of:
   a) placing said instrument proximate to the center of said pipe;
   b) generating said sonic signal, wherein said sonic signal is reflected by said pipe wall surfaces;
   c) detecting said reflected signal from said placed instrument;
   d) detecting said wall surface indicators affected by a property of said lining; and
   e) calculating said thickness from a calculation dependent upon a difference between said arrival times of said detected indicators.

2. A method for determining a generally uncertain property of at least a portion of a layered fluid conduit comprising first and second layers, wherein said generally uncertain property is related to said first layer and a generally uncertain condition is related to said second layer, said method using an instrument capable of detecting a fluid conduit affected signal having indicators of at least two fluid conduit properties wherein said generally uncertain condition also affects said indicators, which method comprises the steps of:
   a) placing said instrument in the vicinity of said fluid conduit where said affected signal can be detected;
   b) detecting said affected signal from said placed instrument;
   c) detecting said indicators within said detected affected signal, said detected indicators constituting discerned indicators; and
   d) calculating said generally uncertain property from a calculation dependent at least in part upon a comparison of said detected indicators to a reference indicator.

3. The method of claim 2 wherein:
said signal detecting step also comprises traversing the instrument proximate to said second layer and detecting a plurality of said affected signals; and
said calculating step also comprises comparing said discerned indicators to a reference first layer property indicator and wherein said calculating step effectively constituting a determining of said generally uncertain property.

4. The method of claim 3 wherein said reference first layer property indicator is calculated based upon at least a portion of one of said plurality of affected signals.

5. The method of claim 4 wherein said calculating step also comprises linearly shifting at least a portion of said indicators based upon a correlation to said reference indicator.

6. The method of claim 2 wherein said instrument detects electromagnetic waves having frequency indicators.

7. An inspection method for determining an otherwise uncertain condition of at least a portion of one layer of a multi-layered material using a signal generator capable of producing a distinct signal directed towards said material, wherein said directed signal is affected by at least two conditions of said multi-layer material to form a data signal, said method also using at least one detector capable of detecting said data signal having an indicator of a first layer condition, said indicator being affected by a second generally uncertain condition, which method comprises the steps of:
a) placing said signal generator and said signal detector at locations in signal communication and generating said distinct signal, said signal detector being placed at a distance from the closest one of said layers;
b) traversing said detector in a direction which generally maintains said distance to said closest one layer;
c) producing a series of said data signals from said traversing detector;
d) selecting a baseline indicator of said first layer condition;
e) detecting said first layer condition indicator within said series of data signals; and
f) calculating a relative shift of at least a portion of said series of data signals based upon a comparison to said baseline indicator, wherein said relative shift produces a series of shifted data signals.

8. The method of claim 7 wherein said multi-layered material is a conduit for conducting fluid proximate to a second layer and said fluid conduit is located within a subsurface borehole, wherein said detecting step also comprises selecting a first indicator window calculated from an expected range of said first layer condition indicators within said data signal.

9. The method of claim 8 wherein said detector and said signal generator are located within an instrument and wherein said traversing step also comprises traversing said signal generator within said instrument along said conduit and wherein said relative shift calculating step produces an aligned series of indicators.

10. The method of claim 9 wherein said selecting of said reference indicator step is based upon one of said first layer condition indicators within said first indicator window.

11. The method of claim 10 wherein said signals are sonic and said first layer condition is a location of a first surface, wherein an adjoining second surface is proximate to said first surface and said detector is capable of producing data signals which also include indicators of said second surface during said traversing, which method also comprises the steps of:
g) calculating a second indicator window from the expected time difference between arrival times of said indicators of said first surface location and a said second surface location within said aligned series of data; and
h) detecting said second surface indicators within said aligned data series within said second window and above a threshold value.

12. The method of claim 11 wherein a plurality of detectors are located near a detector plane which intersects said layers, said detectors producing a plurality of data series, and wherein the step of producing said data signal series also comprises the steps of:
computing an average first surface indicator arrival time from said data signals when said detector plane is near a single location; and
correcting at least one of said data signal series so that said first surface signal return time is equal to said average first signal return time.

13. The method of claim 12 wherein said method also uses a computed value output device, which method also comprises the steps of:
i) computing a representative average thickness value of said first layer over a portion of said conduit based upon said plurality of first and second surface indicators within a corresponding portion of said aligned data series; and
j) transmitting said computed thickness value to said computed value output device.

14. The method of claim 13 wherein said first surface is a first layer to second layer interface, wherein an interior surface of said second layer distal from said interface is said second surface, wherein said fluid is a mixture composed of a liquid and a precipitate, and wherein said second surface is covered by a third layer composed of said precipitate, said third layer having an inner fluid contacting surface, said method also rising the steps of:
k) calculating a third indicator window based upon the difference in an expected range of arrival times of said second surface indicator and an indicator of said fluid contacting surface, based in part upon the speed of said signal through said precipitate material; and
l) detecting said fluid contacting surface indications within said shifted data signals based upon said third window.

15. The method of claim 14 which also comprises the steps of:
m) calculating an iterated baseline indicator of said first surface based upon said detected second surface and fluid contacting surface indicators; and
n) repeating steps f through l.

16. The method of claim 15 which also comprises the steps of:
o) calculating a fourth window to one other surface indicator in said shifted data series; and
p) detecting said one other surface indicator in said shifted data series.

17. The method of claim 16 which also comprises the steps of:

q) computing a property value of one of said layers from at least one of said indicators within said shifted data series; and r) transmitting said computed property value to said output device.

18. The method of claim 17 wherein a safe range of values within a possible range of said property values is required to safely operate said conduit, which method also comprises the steps:

s) comparing said computed property value to said safe range of values to determine if said computed property is within said safe range for conduit operation; and t) correcting said operation when said computed property value is outside said safe range.

19. The method of claim 18 wherein said computed property value determination step also comprises correcting said one indicator for signal transmission loss.

20. The method of claim 19 wherein said computed property is a delamination between two adjacent layers of said multi-layer material and wherein said other surface indicator also indicates a presence of a fluid level within said subsurface borehole.

21. The method of claim 20 wherein said relative shifting also comprises a pre-shift based upon an expected value of said uncertain condition.

22. A method for determining a property of a geothermal fluid conduit from a conduit affected signal, said method comprising:

a) placing an instrument inside said conduit, said instrument being capable of detecting a conduit affected signal having indicators of at least two fluid conduit properties and wherein a generally uncertain condition also affects said indicators;

b) detecting said conduit affected signal with said placed instrument;

c) detecting said affected indicators within said conduit detected signal; and d) calculating said property from a calculation dependent at least in part upon a comparison of at least one of said detected indicators to a reference indicator.

* * * * *